Patented Oct. 30, 1934

1,978,691

UNITED STATES PATENT OFFICE 1,978,691

ARTICLE OF COMMERCE AND METHOD OF ITS PRODUCTION

Stuart M. Phelps, Pittsburgh, Pa., assignor to Ceramic Products Company, Pittsburgh, Pa., a corporation of Delaware No Drawing. Application February 4, 1933, Serial No. 655,255

9 Claims. (Cl. 25—156)

This invention relates to ceramics, and consists in the production of a ceramic material which is relatively hard, dense, impervious, and chemically inert; a material which, further, may possess high tensile strength; may be capable of enduring without fracture wide ranges of temperature variation, and wide differences of temperature as between different portions of an article formed thereof. The material, therefore, is one suitable for the formation of articles and utensils employed in chemical laboratories. Such articles may be formed of the material of the invention easily and cheaply. The material has been developed as a material suitable for making table-tops for chemical laboratories, and to such particular use appeal will hereinafter be made, in illustration of certain features and characteristics of the material.

In the specification of Letters Patent of the United States No. 1,774,812, granted on my application September 2, 1930, I have described a substitute for soapstone, useful as a material for forming articles of laboratory furniture and utensils. The material is initially a solid, porous, ceramic material, whose pores have been filled with another substance, applied in liquid condition. The impregnating substance may, as described in the specification of the patent named, be sulphur, rendered liquid by heat; it may be a phenol condensation product, rendered liquid by solution; or, again, it may be asphalt or pitch, or a casein product. The present invention lies in the same field and consists in a specific material, of peculiar value and excellence for purposes such as those indicated.

I have found that, while minerals of low thermal expansion are manifestly desirable as the ceramic for the end in view, it is not possible to find among minerals of low thermal expansion any one that adequately meets the conditions; but I have discovered that by forming a blend of materials, of which one component is a mineral of low thermal expansion and another a mineral of high heat conductivity, an end product may be obtained which is adequate. While not limiting myself to particular materials—at least, so far as concerns the invention in its broader aspect—I have found that a blend, within ratios to be defined, of cordierite (a mineral of low thermal expansion) and silicon carbide (a mineral of high heat conductivity) is useful and adequate in highest degree, to the end in view. Cordierite is a substance which is chemically inert and otherwise suitable, and which has a low coefficient of thermal expansion. It is a mineral which, although it exists in nature, is not in nature found in such quantities and in such condition as to be commercially available; it may, however, be synthetically prepared, and in more ways than one. My preferred procedure is to prepare it by mixing in suitable proportions and heating together, under proper limitations of time and temperature, kaolin, magnesia, and silica. A typical formula is: MgO, 13.7%; $Al_2O_3$, 34.8%; $SiO_2$, 51.5%.

I preferably combine cordierite with silicon carbide in the ratio of 4:1, and produce a mixture which affords an end product of relatively low coefficient of expansion and of relatively high heat conductivity. By virtue of those combined characters, a table-top formed of my material will, as I have discovered, endure most satisfactorily the temperature conditions of laboratory service.

Other materials, functionally adequate, in place of cordierite, though practically too expensive, are fused silica, and beryl; in place of silicon carbide, dense magnesia may be employed.

In preparing the ceramic I grind the cordierite and the silicon carbide to the desired degree of fineness and add pulverized clay. The clay will ordinarily be a blend of particular clays suitable in quality and quantity to bind the mass. Through the clay is distributed finely divided fibre of combustible nature, ordinarily plant fibre, and most conveniently paper fibre. Paper fibre worked into and distributed through the clay has value in the forming of and completion of the ceramic, in that by virtue of its presence excess of water drains more freely and rapidly away; the fibres serve, after the manner of hair in plaster, to give coherence to the still unfired ceramic mixture; and, with my particular purposes in view, the fibres of paper, burned away in firing, leave minute pores, for the more thorough impregnation of the finished ceramic material.

The cordierite (of commercial grade), the silicon carbide, and the clay may be compounded and mixed together (with water, as is usual) in the proportions of cordierite, 60%; silicon carbide, 15%; clay mixture, 25%. This formula admits of minor modification; it affords, however, a standard, to be approximately adhered to. The clay mixture of this formula includes a combustible substance, and, in consequence, the fired article is porous. If, to the materials specified, wood flour be added (and wood flour may be added), in quantity up to about 5% of the whole, porosity of the fired article will be increased. This may be a desirable modification in using certain pitches.

The ceramic material thus built up and prepared is formed in a mold and fired. In firing, the temperature is caused to rise slowly to, or approximately to, 1000° C. and the temperature is maintained for the desired period of time and the kiln is then allowed to cool in usual manner.

The fired ceramic body is porous, highly absorbent, and comparatively soft, so that it may readily be shaped by suitable means. And I do then preferably shape it to, or approximately to, the ultimate form and size desired.

Having so prepared the core or body of my ultimate article—a table-top, for example, I impregnate it and fill its pores with a suitable substance, applied in liquid condition. I have, in my patent named above, and in the prefatory portion of this specification, enumerated various suitable impregnating materials: among them, asphalt or pitch. For present purposes, and suitable to the ceramic material which I have here specified, I preferably employ pitch. I have discovered that not all pitches are equally suitable; and particularly I have found that the pitch employed may not advantageously contain more than 10% of free carbon. Impregnation with a pitch whose free carbon content exceeds approximately 10% tends to afford in the practice of the invention an impregnated body that is not uniform. Superficially there is an accumulation of free carbon, while so much of the pitch as penetrates deeply is of diminished free carbon content. If the pitch employed has a free carbon content of less than 10%, such a condition of non-uniformity will not be of appreciable magnitude. Pitch which contains not more than 10% of free carbon and which has a melting-point in the neighborhood of 100° C. (with latitude of twenty degrees either way—that is to say, of a melting-point ranging from 80° to 120° C.) is suitable. Hardwood pitch, however, whose melting-point ranges from 50° to 90° C. may be used. Water-gas pitch is preferred to hardwood pitch. I have obtained best results by blending asphalt of commerce, such as is now commonly used for impregnating paper conduits, which is itself a pitch, and which is very low in free carbon, with water-gas pitch (which also is low in free carbon). With good results this asphalt of commerce may alternatively be blended with hardwood pitch. The asphalt alone is, for my purposes, somewhat lacking in strength, and affords a finished article less resistant to fracture; pitch alone affords an article which is relatively liable to crack; but the blend affords best results.

Impregnation is effected by melting the pitch, heating the porous body to the same temperature as the pitch (200° C. more or less), immersing the body in the pitch, and allowing it to soak for an hour or two. A pressure of forty pounds, more or less, may then be applied, and maintained for four or five hours, after which the article, adequately impregnated, may be removed from the bath of pitch, ready for further treatment.

The impregnated article is then heat treated. The temperature is raised slowly, during an interval of approximately three days, to approximately 400° C., which high temperature is maintained for approximately twenty-four hours longer. Under these conditions the volatile matter in the pitch is driven off, and some cracking of hydrocarbons is effected. It is the object of this coking step to produce a filling of permanent nature (so that the table-top—for example—will not, under high temperature incident to service, smoke) and which is of relatively low thermal expansion. The relatively long coking period which, as I have said, is preferred affords an end product of best quality in this matter of thermal expansion.

After the high temperature of coking has so been maintained for a day, the article may be cooled in the course of twelve hours, more or less; and then, with or without further dressing or finishing, is ready for use. It may be used in many particular applications as a substitute for soapstone, it possesses particular characteristics which render it superior to soapstone: it is lighter in weight, more uniform in structure, more resistant to abrasion, and stronger, and the mode of manufacture is such that an article of almost any shape may be produced. And the articles may be cheaply produced.

While I have, for purposes of illustration, repeatedly alluded to table-tops for chemical laboratories, it will be manifest that other articles and utensils may be shaped from the ceramic material, fired, and impregnated and coked, and thus rendered embodiments of the invention.

I claim as my invention:

1. A porous ceramic body formed substantially of cordierite and clay, impregnated with a filling material.

2. A porous ceramic body formed of a material of low thermal expansion, a material of high thermal conductivity, and clay, impregnated with a filling material.

3. A porous ceramic body formed of cordierite modified by an addition of a material of high heat conductivity, and clay, impregnated with a filling material.

4. A porous ceramic body compounded of cordierite silicon carbide and clay, impregnated with a filling material.

5. A porous ceramic body formed substantially of cordierite and clay whose pores are filled with coked hydrocarbon.

6. The method herein described of producing an article of inert character which consists in producing a porous body of fired ceramic, impregnating such porous body with a pitch whose ingredient of free carbon is in quantity not greater than 10%, and subjecting the impregnated body to coking temperature.

7. The method herein described of producing an article of inert character which consists in producing a porous body of fired ceramic, impregnating such porous body with a pitch whose ingredient of free carbon does not exceed 10%, heating the impregnated body gradually in the course of three days to a temperature of 400° C. and maintaining it at such temperature for twenty-four hours, with coking of the impregnating pitch in situ, and finally allowing the body to cool.

8. The method herein described of producing an article of inert character which consists in blending the paper-impregnating asphalt of commerce with water-gas pitch, impregnating with the blended material a porous body of fired ceramic, and subjecting the impregnated body to coking temperature.

9. The method herein described of producing an article of inert character which consists in blending the paper-impregnating asphalt of commerce with hardwood pitch, impregnating with the blended material a porous body of fired ceramic, and subjecting the impregnated body to coking temperature.

STUART M. PHELPS.